(12) United States Patent
Jing

(10) Patent No.: US 6,748,795 B1
(45) Date of Patent: Jun. 15, 2004

(54) PENDULUM SCANNER FOR SCANNING PROBE MICROSCOPE

(75) Inventor: Tianwei Jing, Tempe, AZ (US)

(73) Assignee: Molecular Imaging Corporation, Tempe, AZ (US)

(*) Notice: Subject to any disclaimer, the term of this patent is extended or adjusted under 35 U.S.C. 154(b) by 0 days.

(21) Appl. No.: 10/205,778

(22) Filed: Jul. 26, 2002

Related U.S. Application Data

(60) Provisional application No. 60/308,336, filed on Jul. 27, 2001.

(51) Int. Cl.[7] .............................. G01B 5/28; G01B 7/34; G01N 13/16
(52) U.S. Cl. .......................... 73/105; 250/306; 250/307
(58) Field of Search .............................. 73/105; 250/306, 250/307

(56) References Cited

U.S. PATENT DOCUMENTS

| | | |
|---|---|---|
| 5,291,775 A | 3/1994 | Gamble et al. |
| 5,306,919 A | 4/1994 | Elings et al. .......... 250/442.11 |
| 5,319,960 A | 6/1994 | Gamble et al. |
| 5,440,920 A | 8/1995 | Jung et al. ..................... 73/105 |
| 5,587,523 A | 12/1996 | Jung et al. ..................... 73/105 |
| 6,032,518 A | 3/2000 | Prater et al. ................... 73/105 |
| 6,121,611 A | 9/2000 | Lindsay et al. |
| 6,194,813 B1 | 2/2001 | Israelachvili |
| 6,257,053 B1 | 7/2001 | Tomita et al. ................. 73/105 |
| 6,612,160 B2 * | 9/2003 | Massie et al. ................. 73/105 |

* cited by examiner

Primary Examiner—Daniel S. Larkin
(74) Attorney, Agent, or Firm—Dinsmore & Shohl LLP

(57) ABSTRACT

A pendulum scanner that utilizes a rocking motion to scan across a sample surface is provided. The scanner is present as a component in a scanning probe microscope that includes a microscope base, an optical stage, and a sample stage. The optical stage includes a source of a collimated beam of light, at least one beam tracking element, and a first scanning element for generating movement of the optical stage in a first plane. The microscope also includes a cantilever probe having a light-reflective surface. A second scanning element is provided for generating movement of the optical stage in a second plane that is orthogonal to the first plane. A position sensitive detector is also provided and is adapted to receive a beam of light reflected from the surface of the cantilever probe and to produce a signal that is indicative of the angular movement of the reflected beam of light.

31 Claims, 7 Drawing Sheets

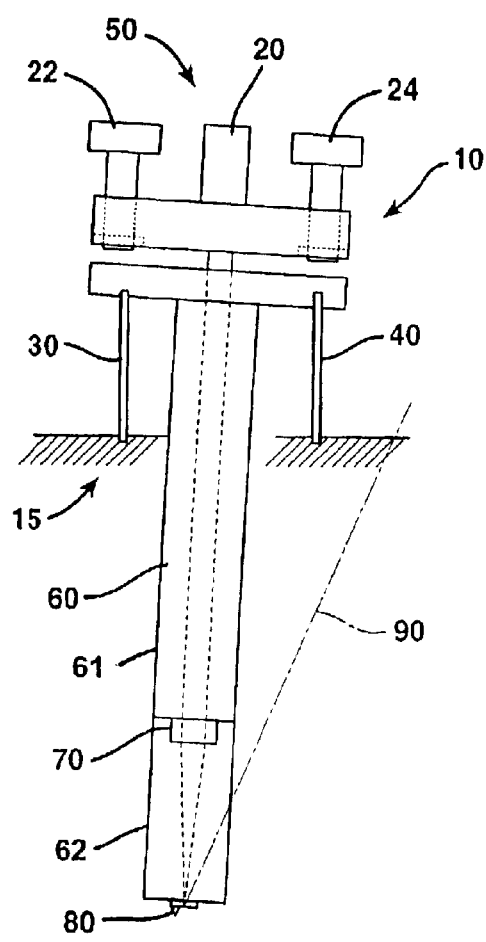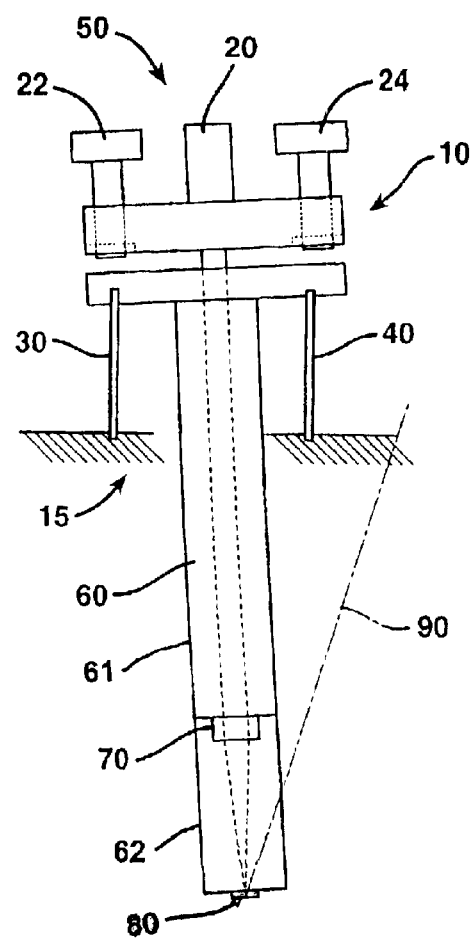

PENDULUM SCANNER FOR SCANNING PROBE MICROSCOPE

This application claims benefit of 60/308,336 filed on Jul. 27, 2001.

BACKGROUND OF THE INVENTION

The present invention relates to electro-mechanical mechanisms which create orthogonal and/or vertical motion, and more particularly to a piezoelectric positioning device for use in scanning probe microscopy, including atomic force microscopy, that provides precise motion in an orthogonal plane using a simple direct rocking or pendulum mechanism.

In general terms, scanning probe microscopes (SPMs) operate by positioning a probe tip adjacent a sample surface and then moving the probe tip vertically and/or laterally to obtain a deflection force (vertical tip movement) or a topographical image (lateral tip movement) of the surface of the sample. The generation of data with respect to the sample surface is generally done by measuring the change in the angle of deflection of the back surface of the probe, typically in the form of a cantilever with a sharp tip, as the probe tip is moved along the surface of the sample. Such a change in angle is typically measured by reflecting a beam of collimated light (laser) off of the back surface of the probe to a position sensitive photodetector.

To obtain accurate and reliable images of the sample surface, one must be able to move the probe tip in a precise manner and measure that movement accurately. In most SPM applications, there is a need to scan a sample in a lateral direction over a distance of several tens or hundreds of microns. The most common method for scanning cantilever probes over a sample surface is a piezoelectric element in the form of a cylindrical tube. FIG. 1 illustrates a conventional prior art tube-scanning element. An annular tube 6 of piezoelectric material is provided with multiple metal electrodes 1, 2, 3, and 4 plated onto its exterior surface. Typically, such scanning elements are divided into four sectors. A common inner electrode 5 completes the electrical circuit. Application of different voltages to electrodes 1, 2, 3, and 4 produces movement of the tube. A scanning cantilever probe is secured to one end of the tube and moves in concert with the tube when a voltage is applied to one or more of the electrodes.

For example, motion in the Z (vertical) direction is produced by applying the same voltage differential across the inner and outer walls of tube 6. Typically, a positive voltage differential produces expansion of the tube, while a negative voltage differential produces contraction. Lateral motion along the x-y orthogonal axis is produced by applying different voltages across the four electrodes. For example, if a positive voltage is applied to electrode 1 and a negative voltage is applied to electrode 2, the tube will bend along the +X-axis. As is well understood in this art, application of other combinations of voltages will result in the tube bending in the −X, +Y, and −Y-axes, respectively. And, for at least very short distances, such bending will be linear in proportion to the applied voltage signals.

However, because the tube is mechanically integral, even though the electrodes are electrically isolated, large stresses are generated between adjacent quadrants (sections of the tube beneath electrodes 1–4) when those quadrants move under the influence of the applied voltage signals. The stresses that are encountered limit the range of motion that is possible and increase the coupling between quadrants, a phenomena known as x-y coupling. That is, a voltage applied to generate a deflection of the tube in the X direction gives rise to some deflection in the Y direction as well. Further, the motion of the tube becomes increasingly non-linear as the range of motion is increased because mechanical motion no longer is proportional to applied voltage. Thus, conventional tube scanners have limited ranges of motion, or, alternatively, accuracy is degraded as the range of motion is increased.

One invention that has improved the accuracy of piezoelectric tube scanners has been the development of generally S-shaped tubular elements such as those taught in Elings et al, U.S. Pat. No. 5,306,919. Such S-shaped elements better maintain length for the scanner during movement in the X- and Y-axes. Israelachvili, U.S. Pat. No. 6,194,813, teaches the use of partially segmented piezo-mechanical elements (partially cut tube) in combination with a lever mounted about a pivot point to convert vertical expansion and/or contraction of the piezo segments into lateral motion. However, the Israelachvili construction is somewhat complex and requires a series of springs mounted in a specified relation to one another to create the linear movement of the probe tip. This results in a device that has a low resonant frequency that limits imaging speed in operation. Further, machining and cutting of the piezo tube adds micro-defects as well as labor costs to the device.

Another invention that has improved the accuracy of scanning elements is the use of a beam-tracking element such as that taught by Jung et al, U.S. Pat. No. 5,440,920. In such an arrangement, a lens is interposed into the path of the collimated light source to track translational movement of the probe and maintain focus of the light onto the back surface of the cantilever probe.

However, evenwhen using a beam tracking lens arrangement, the deflection signal reflected from the back surface of the cantilever probe is very sensitive to the location of the spot of collimated light on the back surface of the cantilever. A slight change in position of the spot of light causes the signal intensity received by the position detector to change due to changes in the optical texture of the cantilever reflecting back surface on a micron scale. Thus, even with a beam tracking lens arrangement, there is distortion of the signal recorded on a perfectly flat cantilever surface, an effect that has been termed "bow."

Accordingly, the need still exists in this art for a scanner construction and method of operation that overcomes the significant drawbacks of the prior art.

SUMMARY OF THE INVENTION

The present invention meets that need and overcomes the problems of prior art systems by providing a scanner which operates to provide precise motion using a simple direct rocking mechanism. In accordance with one aspect of the present invention, a scanner for a scanning probe microscope is provided and includes a microscope base, an optical stage, and a sample stage. The optical stage includes a source of a collimated beam of light, at least one beam-tracking element, and a first scanning element for generating movement of the optical stage in a first plane. The scanner also includes a cantilever probe having a light-reflective surface, the probe having a first end having a tip extending toward the sample stage and a second end coupled to the first scanning element. A second scanning element is provided for generating movement of the optical stage in a second plane that is orthogonal to the first plane, the second scanning element being coupled to the microscope base. A position sensitive detector is also provided and is adapted to receive the beam of light reflected from the surface of the cantilever probe and to produce a signal that is indicative of the angular movement of the reflected beam of light.

In a preferred embodiment, the first scanning element comprises an annular tube and the source of the beam of collimated light is a laser. The laser is directed toward the surface of the cantilever probe through the annular opening in the first scanning element. The at least one beam tracking element comprises a lens. The first scanning element is preferably a piezo-mechanical material that is driven to provide movement of the optical stage along a first (Z-) axis. Unlike typical scanning elements in the prior art, the first scanning element does not bend. This provides a construction in which the source of the collimated beam of light, the at least one beam tracking element, and the cantilever probe are in a fixed relationship such that there is no relative movement among any of these elements in the second (X-Y axis) plane.

The second scanning element is also preferably a piezo-mechanical material and is adapted to generate movement of the optical stage along a first axis (X-axis) in the second plane that is independent from movement of the optical stage along a second axis (Y-axis) in the second plane. In a preferred form, the second scanning element comprises a plurality of sectors or pieces coupled to the microscope base. Because the sectors are not physically coupled to one another, no stresses are encountered during X-Y axis movement, eliminating the x-y coupling problem of the prior art.

For optimum signal detection, the detector is positioned at a location determined by the convergence of light reflected from the surface of said cantilever over the full extent of cantilever movement in the second plane. That is, the beams of collimated light that are reflected from the surface of the cantilever converge at substantially a single point over the entire extent of cantilever scanning across a sample surface. Further, in a preferred embodiment, the detector is located at a distance from the surface of the cantilever that is equal to 0.94 times the distance from the pivot point of the light beam to the surface of the cantilever. It has been determined that, for a cantilever which is angled 10° from normal to the long axis of the optical stage, the detector is best positioned at a location along a plane lying at an angle of 70° with respect light reflected from the surface of the cantilever.

In another embodiment of the invention, the optical stage provides optical access to an optical microscope that can be used to view aspects of the sample surface in conjunction with the data collected by scanning the cantilever across the sample surface.

In accordance with another aspect of the present invention, a method of operating a scanning probe microscope is provided and includes impinging a collimated beam of light (from a suitable source such as a laser) onto a light reflective surface of a cantilever probe having a tip extending toward a sample, moving the cantilever probe tip across the surface of the sample using a rocking motion, detecting light reflected from the surface of the cantilever probe, and producing a signal indicative of the angular movement of the reflected light. Preferably, the collimated beam of light and the cantilever probe are in a fixed relationship such that there is substantially no relative movement between them.

Movement of the cantilever probe in a direction orthogonal to the surface of the sample is independent of movement of the cantilever probe tip across the surface of the sample. This is because the rocking motion is generated by a scanning element that comprises a plurality of sectors of a piezo-mechanical material. Each sector is operated independently of the others, and is also operated independently of any Z-axis movement of the probe. Preferably, each of the sectors is driven independently using opposing voltages. In one form, the collimated beam of light passes through a beam-tracking element that focuses the collimated beam of light onto the reflective surface of the cantilever probe.

An additional feature of the present invention derives from the use of separate scanning elements to provide independent movement of the cantilever probe in the Z and X-Y axes, respectively. Segmenting the first scanning element into a plurality of portions, and activating one, or the other, or both portions can adjust the range of movement of the scanner along the Z-axis to improve image resolution.

Accordingly, it is a feature of the present invention to provide a scanner in a scanning probe microscope which overcomes the tracking problems associated with prior art systems. This, and other advantages and features of the invention, will become apparent from the following detailed description, the accompanying drawings, and the appended claims.

BRIEF DESCRIPTION OF THE DRAWINGS

In order to aid in a better understanding of the invention, reference will now be made, by way of example, to the accompanying drawings in which:

FIGS. 3A and B are schematic depictions of scanning movement of the optical stage of the microscope;

DETAILED DESCRIPTION OF THE PREFERRED EMBODIMENTS

Figure 2:
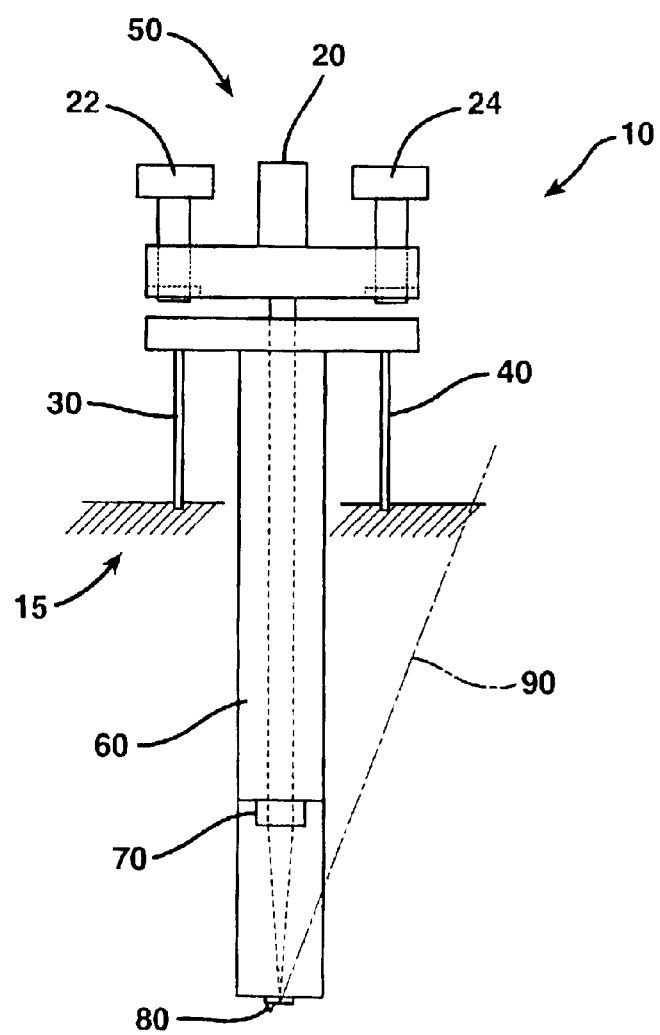
FIG. 2 is a side view, in schematic form, of a portion of the scanning probe microscope of the present invention.

The basic elements of the scanner portion of the microscope of the present invention are shown in FIG. 2. Other known and conventional elements of scanning probe microscopes, including atomic force microscopes, are shown only to the extent needed for an understanding of the present invention. References to X-, Y-, and Z-axes herein refer to the Cartesian coordinate system of three orthogonal axes. As used herein (unless otherwise indicated), movement along the Z-axis is movement in a vertical direction in the drawings, movement along the Y-axis is movement left o-right (and vice versa) horizontally across the drawings, and movement along the X-axis is movement in a plane normal to the drawings (i.e., into and out of the page).

To overcome the tracking problems of the prior art (including x-y coupling and non-proportional movement versus applied voltage), a "pendulum" scanner, shown generally at 10, is provided which utilizes a rocking motion to scan a cantilever probe tip across the surface of a sample. Referring to FIG. 2, a source of a beam of collimated light such as, for example, a miniature diode laser 20 is positioned at or near the pivotal point of the scanner to minimize the inertia of the laser diode and adjustment screws 22, 24. The laser 20 is mounted on a twbaxis optical adjustment stage 50 that, in turn, rests on the scanning mechanism (to be described below), two segments of which are shown as plates 30 and 40.

These scanning segments or plates are, in turn, affixed or otherwise coupled to the base of the microscope 15. A vertically oriented, annular tube scanner 60 extends downwardly from optical adjustment stage 50, and its operation provides movement of the cantilever along the Z-axis. Tube scanner 60 includes at least one beam-tracking element, such as for example, lens 70, that focuses the laser beam onto a force-sensing cantilever 80. Cantilever 80 has a construction that is known in this art. Specifically, cantilever 80 has a first end with a sharp tip that extends downwardly toward a sample surface and a second end that is coupled to the base of scanner tube 60. See, e.g., Lindsay et al, U.S. Pat. No. 6,121,611, the disclosure of which is hereby incorporated by reference, for typical cantilever constructions. The back (upper) surface of the cantilever is reflective so that focused light from laser 20 is reflected off of the back surface of cantilever 80 to produce a beam 90 that will be detected and yield a cantilever deflection signal as described below.

The materials of construction of scanning tube 60 and plates or segments 110, 120, 130, and 140 (see FIG. 4) are known in the art and comprise piezomechanical compositions which will contract or expand depending upon the application of voltage signals to electrodes positioned on opposing surfaces of the scanner.

The rocking movement of scanner 10 is shown schematically in FIGS. 3A and 3B. As shown, for scanning in the negative (−)Y-axis direction, scanning segment or plate 30 is expanded and segment 40 is contracted to cause the optical stage 50 to rock in a pendulum-like motion to the left (FIG. 3A). Scanning in the positive (+) Y-axis direction occurs with the opposite operation. Scanning segment 30 is contracted and segment 40 is expanded producing a rocking motion of optical stage 50 to the right (FIG. 3B). Scanning in the positive and negative (+ and −) X-axis directions occur by activating other scanning segments, located orthogonally to segments 30 and 40, but not shown in FIGS. 3A or 3B. A significant advantage of the pendulum scanner of the present invention is that because vertical scanning tube 60 is not involved in X- or Yaxis movement and does not bend, laser 20, beam tracking element 70 and cantilever probe 80 are in a fixed relation such that there is no relative movement among them in the X-Y plane. Thus, focused light emanating from laser 20 remains perfectly aligned on the back surface of cantilever 80 throughout the full range of movement of the scanner assembly.

Another advantage of the present invention also derives from the fact that vertical scanning tube 60 operates independently of scanning along the X-Y axis to provide Z-axis movement of the cantilever probe tip 80. In one embodiment of the invention, scanning tube 60 may be segmented into a plurality of portions 61 and 62, providing the user with a choice of activating either one of the portions or both. For example, one can divide a scanning tube having a length of 5 cm into segments of 1 cm and 4 cm, respectively. Because the image resolution in the Z-axis typically varies inversely to the range of Z-axis movement of the scanning element, one can enhance resolution simply by selecting which scanning segment or combination of segments to activate. Thus, for example, applying a voltage only to the electrodes connected to the 1 cm segment produces less movement of the probe tip in the Z-axis direction than the application of a voltage to both scanner segments. Less movement of the probe tip in the Z-axis direction provides enhanced image resolution of a sample surface.

Figure 1:
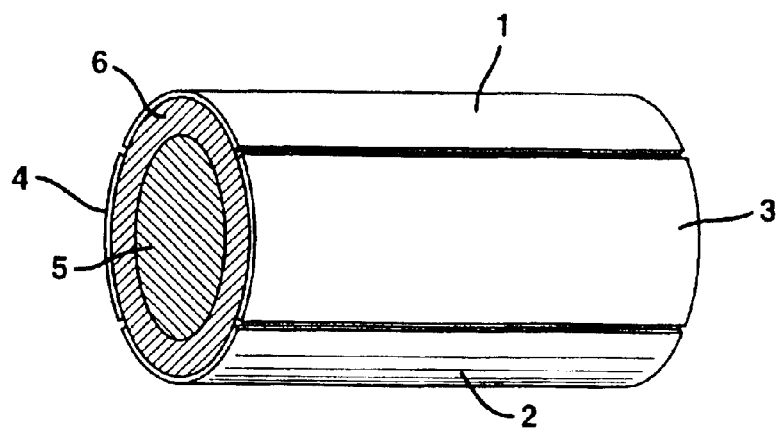
FIG. 1 is a perspective view of a tubular scanning element of the prior art.
Figure 4:
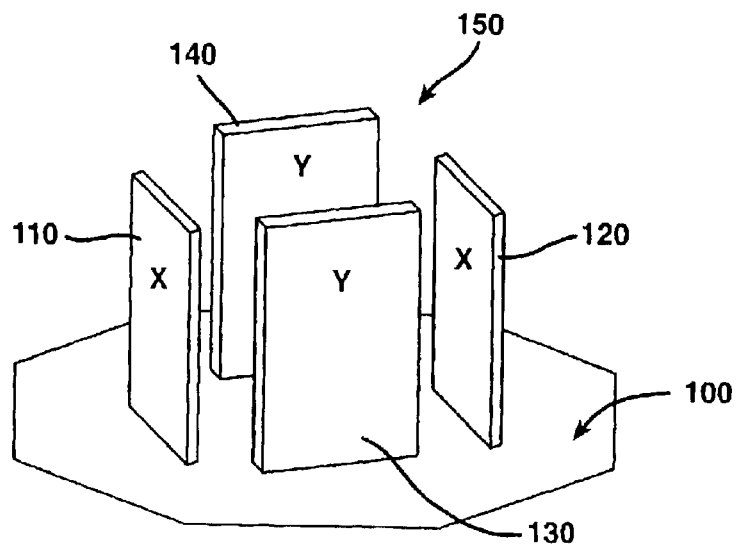
FIG. 4 is a perspective view of the independent piezo-mechanical sectors coupled to the microscope base.

The deflection mechanism 150 is shown schematically in FIG. 4. In the embodiment illustrated, a set of four independent piezo-mechanical segments 110, 120, 130, and 140 are arranged at 90° angles to one another and affixed to the base 100 of the microscope. Use of independent and separate piezo-mechanical segments in the form of flat plates instead of a tube as in the prior art (see, FIG. 1) to provide movement in the X-Y-axis eliminates the stresses between the quadrants in the prior art tube design. Utilization of flat plates as the scanner segments permits the positioning of each plate in precise orthogonal relationship to the other plates. This arrangement eliminates x-y coupling and increases the driving efficiency of the assembly in the X and Y-axes.

Another advantage of using separate and independent segments is that each segment can be biased with independent opposing voltages +V and −V through electrodes located on opposite sides of each of the segment. Operation in this manner increases the electrical field inside the piezo-mechanical segments and results in a larger extension (i.e., expansion or contraction of the segment). Such larger extension results in the generation of larger movements in the X- and Y-axes than a tubular-shaped piezo-mechanical element of equivalent size.

Figure 5:
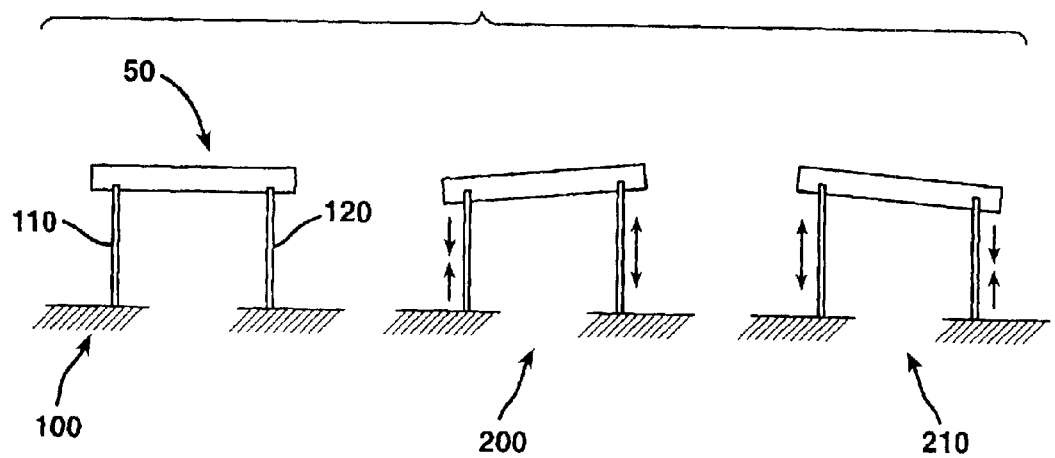
FIG. 5 is a schematic depiction of the operation of the scanning mechanism.

Referring now to FIG. 5, the four piezo-mechanical segments 110, 120, 130 and 140 are mounted on and affixed to the base 100 of the microscope. Optical stage 50 rests atop the segments. The rocking movement of optical stage 50 is shown schematically to be the result of the application of opposite voltages to opposing segments such that the cantilever-mounted end of vertical scanning tube 60 rocks to the right (indicated at 200) or the left (indicated at 210) depending on the direction of the applied voltages to the scanning segments.

Figure 6:
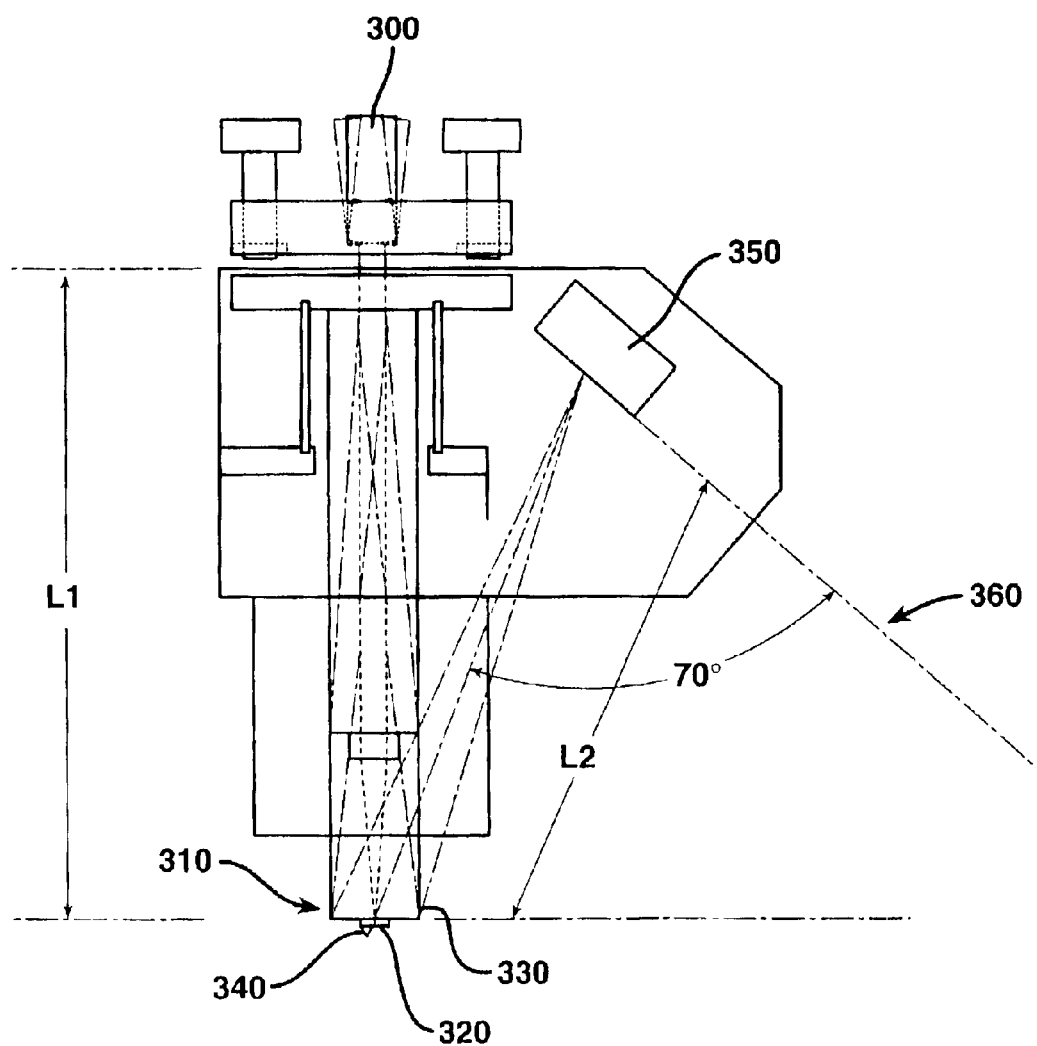
FIG. 6 is a side view, in schematic form, illustrating the location of the position sensitive detector with respect to the optical stage of the microscope.

Even with the precise tracking of laser, beam tracking element, and cantilever, a small component of angular motion in the Z-axis direction of the end of the cantilever may cause an erroneous response in the detector in recording the movements of the cantilever tip in the X- and Y-axes. Such errors are minimizeds using the arrangement shown in FIG. 6. As shown, laser 300 is rocked (as described above) to track the motion of the cantilever 340 across the suface of a sample. Light from laser 300 is reflected off of the back surface of the cantilever and detected by detector 350. Exemplary reflected beams of light are depicted for the leftmost excursion of the scanner (+Y-direction at 310), in the zero position (at 320) and at the rightmost excursion of the scanner (−Y-direction at 330). With the cantilever angled at 10° down from perpendicular to the long axis of the scanner, the reflected light beams are as shown in the figure. Surprisingly, those reflected beams converge almost to a single point on a plane (shown at 360) lying at a 70° angle with respect to the central (zero position) reflected beam and at a distance from the cantilever (L2) related to the distance to the pivot point (L1) by L2/L1=0.94 for the arrangement shown. Placing the detector at this unique distance minimizes detector error.

A further aspect of the present invention is the recognition that the detector remains at this unique location where reflected light beams converge when the detector is translated to accommodate the use of bent cantilevers (i.e., where the angle of tilt is no longer 10° down from normal) when the detector is positioned on a plane inclined at the 70° angle shown.

Figure 7:
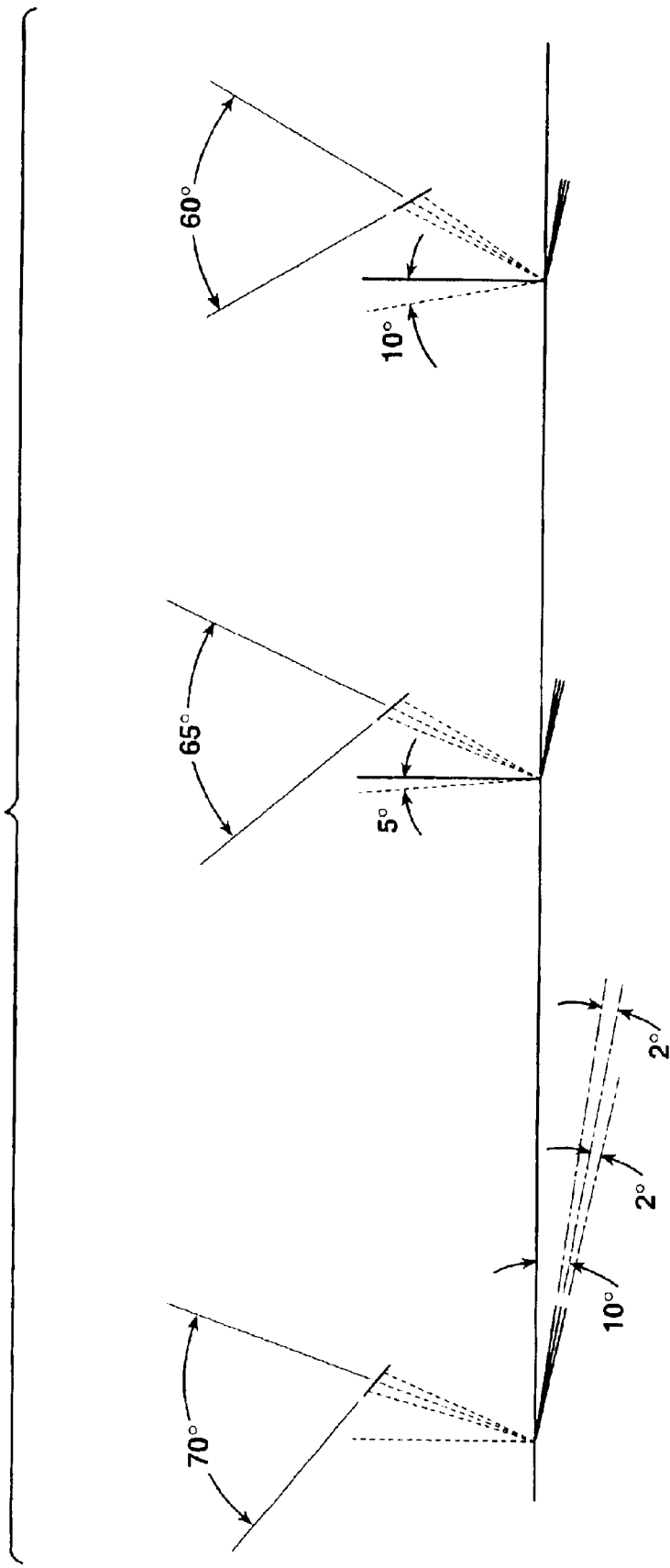
FIG. 7 depicts how changes in the angle of incidence of the light beam on the cantilever affect the location of the plane of the detector.

Often, it is desirable to have the laser beam impinge upon the back surface of the cantilever at an angle other than 90° to the cantilever's long axis. The same unique detector location and special plane can be determined, but it is tilted as shown in FIG. 7. That is, if the laser beam impinges on the cantilever 5° from normal, the detector needs to be translated along a plane inclined at 65° to the beam as shown in FIG. 7. Likewise, if the laser beam impinges on the cantilever 10° from normal, the detector needs to be translated along a plane inclined at 60° to the beam.

The identification of this unique convergent plane provides additional significant advantages when the microscope is operated in liquids (i.e., the sample is immersed in a liquid. Because the index of refraction of light changes at air/liquid interfaces, the reflected beam of light from the laser also changes its angle of reflection. Thus, the detector must be re-positioned into alignment with the new angle of reflection. For typical prior art scanning probe and atomic force microscopes, the operator must first align the reflected beam of light with the detector in air to insure that the detector is located properly and then re-adjust the position of the detector for operation in liquids. In many cases, the re-adjusted position does not align with the convergent point at all. The present invention utilizes the convergent plane (70° angle from the reflected light beam) that simplifies detector location adjustment. By designing the detector to move in the convergent plane, operator re-adjustment for operation in liquids requires only simple movement of the detector along the convergent plane to re-locate the detector to its proper position to acquire signals from the reflected beam as it emerges from the liquid.

Figure 8:
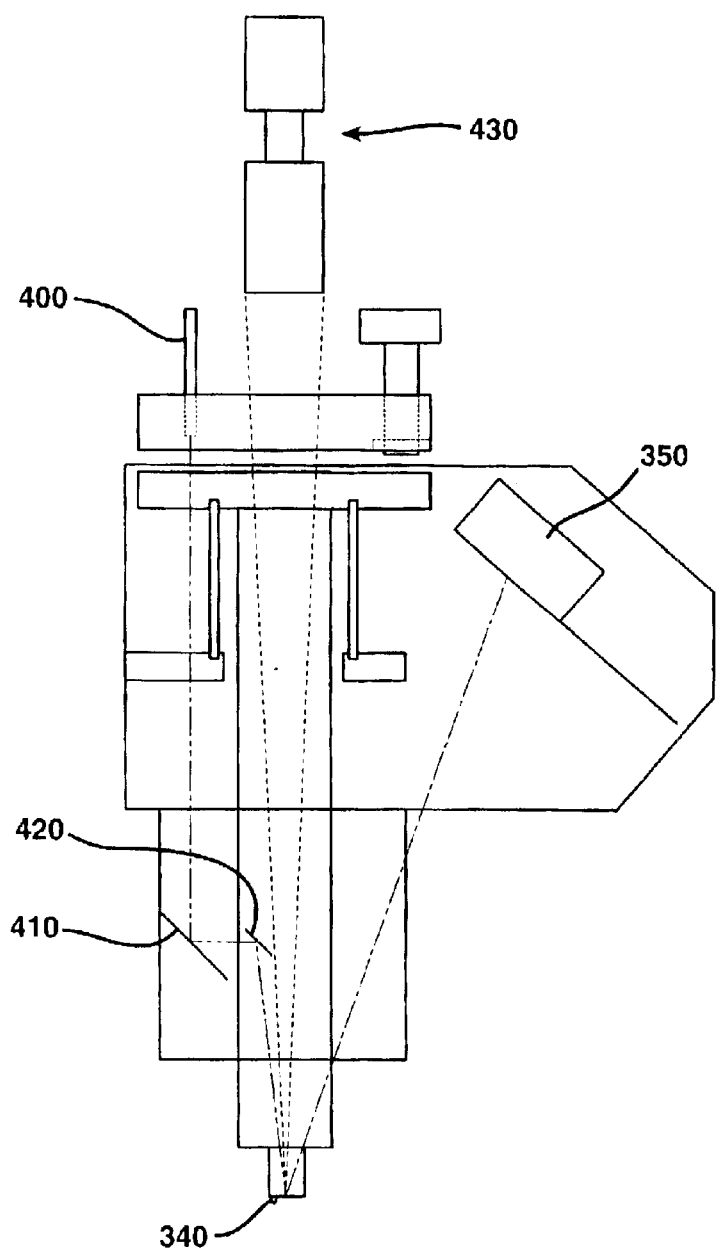
FIG. 8 depicts one form of the scanning probe microscope of the present invention showing one construction to provide access for an optical microscope.

For many uses of the microscope, it is desirable to have optical access to the cantilever from above. In the embodiment illustrated in FIG. 8, laser 400 is moved to the location shown, off of the center axis of the optical stage. To accomplish this, two mirrors 410 and 420 are positioned as shown to redirect the beam through the at least one beam tracking element (such as a focal lens) and onto the back surface of the cantilever 340. The center axis through the optical stage axis is open to accommodate viewing with another optical device such as, for example, video microscope 430.

Figure 9:
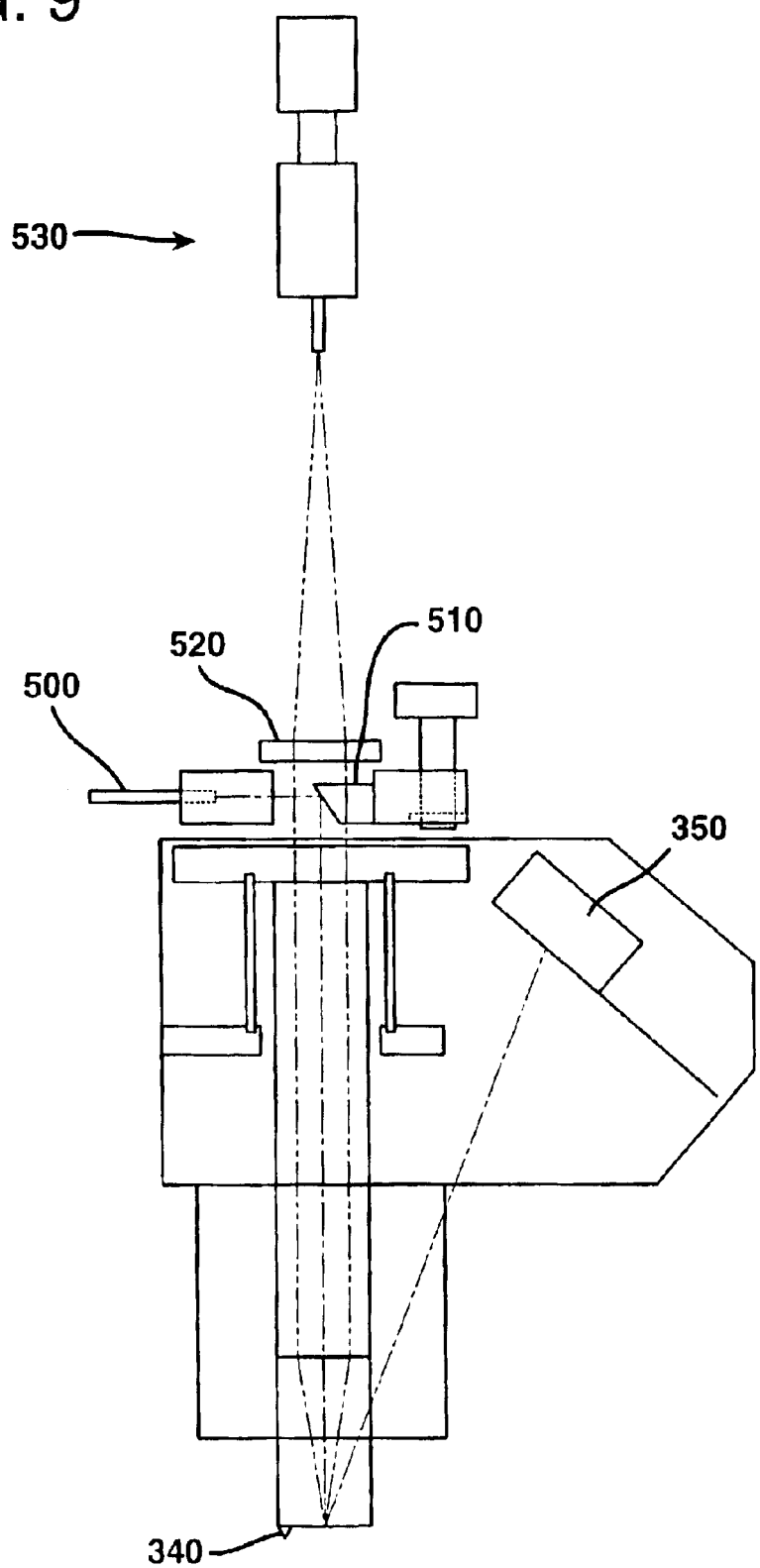
FIG. 9 depicts another form of the scanning probe microscope of the present invention showing an alternative construction to provide access for an optical microscope.

In an alternative embodiment, optical access is provided by incorporating the optical viewing system as shown in FIG. 9. By positioning an imaging lens 520 above the scanner, a virtual image of the cantilever is formed that allows optical viewing system 530 (such as, for example, a video microscope) to view the cantilever from above. A collimated beam of light from laser 500, located off of the center axis of the optical stage, is directed onto the cantilever through a mirror 510 that re-directs the light onto the back surface of the cantilever.

While certain representative embodiments and details have been shown for purposes of illustrating the invention, it will be apparent to those skilled in the art that various changes in the methods and apparatus disclosed hereinmay be made without departing from the scope of the invention.

What is claimed is:

1. A scanner for a scanning probe microscope comprising, a microscope base; an optical stage comprising a source of a collimated beam of light, at least one beam-tracking element, and a first scanning element for generating movement of said optical stage in a first plane; a sample stage; a cantilever probe having a light-reflective surface, said probe having a first end having a tip extending toward said sample stage and a second end coupled to said first scaning element; a second scanning element for generating movement of said optical stage in a second plane orthogonal to said first plane for scanning said probe tip across the surface of a sample, said second scanning element being coupled to said microscope base; and a position sensitive detector adapted to receive a beam of light reflected from said surface of said cantilever probe and to produce a signal indicative of the angular movement of said reflected beam of collimated light resulting from the movement of said probe tip across said surface of said sample.

2. A scanner as claimed in claim 1 in which said first scanning element comprises an annular tube.

3. A scanner as claimed in claim 1 in which the source of said beam of collimated light comprises a laser.

4. A scanner as claimed in claim 3 in which said laser is directed toward said surface of said cantilever probe through an annular opening in said first scanning element.

5. A scanner as claimed in claim 1 in which said at least one beam tracking element comprises a lens.

6. A scanner as claimed in claim 1 in which said first scanning element comprises a piezo-mechanical material which is driven to provide movement of said optical stage along a first (Z-) axis.

7. A scanner as claimed in claim 6 in which said first scanning element comprises a plurality of segments.

8. A scanner as claimed in claim 7 in which each of said plurality of segments is adapted to be activated either individually or in combination.

9. A scanner as claimed in claim 1 in which said source of said collimated beam of light, said at least one beam tracking element, and said cantilever probe are in a fixed relationship such that there is substantially no relative movement in said second plane.

10. A scanner as claimed in claim 1 in which said second scanning element comprises a piezo-mechanical material.

11. A scanner as claimed in claim 1 adapted to generate movement of said optical stage along a first axis in said second plane that is independent from movement of said optical stage along said second axis in said second plane.

12. A scanner as claimed in claim 1 in which said second scanning element comprises a plurality of sectors coupled to said microscope base.

13. A scanner as claimed in claim 12 in which said sectors comprise generally flat plates.

14. A scanner as claimed in claim 13 in which said sectors extend substantially normal to said microscope base.

15. A scanner as claimed in claim 14 including four sectors arranged substantially at 90° angles to one another.

16. A scanner as claimed in claim 1 in which said detector is positioned at the convergence of light reflected from said surface of said cantilever over substantially the full extent of cantilever movement in said second plane.

17. A scanner as claimed in claim 1 in which said detector is located at a distance from said surface of said cantilever equal to 0.94 times the distance from said source of said light beam to said surface of said cantilever.

18. A scanner as claimed in claim 1 in which said cantilever is angled 10° from normal to the long axis of said optical stage, and said detector is positioned at a location along a plane lying at an angle of 70° with respect to light reflected from said surface of said cantilever.

19. A scanner as claimed in claim 1 further including an optical microscope, said optical stage providing optical access to said optical microscope for viewing said sample surface.

20. A scanner for a scanning probe microscope including a microscope base, an optical stage, a cantilever probe, a first scanning element for generating movement of said optical stage in a first plane said cantilever probe coupled to said first scanning element, and a second scanning element for generating movement of said optical stage in a second plane orthogonal to said first plane for scanning said cantilever probe across the surface of a sample, said second scanning element comprising a plurality of sectors coupled to said microscope base.

21. A scanner as claimed in claim 20 further including a beam-tracking element.

22. A scanner as claimed in claim 21 in which said optical stage, said beam tracking element, and said cantilever probe are in a fixed relationship such that there is substantially no relative movement in said second plane.

23. A scanner as claimed in claim 20 in which said sectors comprise generally flat plates.

24. A scanner as claimed in claim 23 in which said sectors extend substantially normal to said microscope base.

25. A scanner as claimed in claim 24 including four sectors arranged substantially at 90° angles to one another.

26. A method of operating a scanning probe microscope comprising impinging a collimated beam of light onto a light reflective surface of a cantilever probe having a tip extending toward a sample, moving said cantilever probe tip across the surface of said sample using a rocking motion, detecting light reflected from said surface of said cantilever probe, and producing a signal indicative of the angular movement of said reflected light.

27. A method as claimed in claim 26 in which said collimated beam of light and said cantilever probe are in a fixed relationship such that there is substantially no relative movement between them.

28. A method as claimed in claim 26 in which movement of said cantilever probe in a direction orthogonal to the surface of said sample is independent of movement of said cantilever probe tip across the surface of said sample.

29. A method as claimed in claim 26 in which said rocking motion is generated by a scanning element comprising a plurality of sectors of a piezo-mechanical material.

30. A method as claimed in claim 29 in which said plurality of sectors are driven independently using opposing voltages.

31. A method as claimed in claim 26 in which said collimated beam of light passes through a beam tracking element that focuses said collimated beam of light onto said reflective surface of said cantilever probe.

* * * * *